United States Patent
Lamson (10) Patent No.: US 10,927,705 B2
(45) Date of Patent: Feb. 23, 2021

(54) METHOD FOR FORMING COOLING HOLES HAVING SEPARATE COMPLEX AND SIMPLE GEOMETRY SECTIONS

(71) Applicant: United Technologies Corporation, Farmington, CT (US)

(72) Inventor: Scott H. Lamson, Menands, NY (US)

(73) Assignee: Raytheon Technologies Corporation, Waltham, MA (US)

( * ) Notice: Subject to any disclaimer, the term of this patent is extended or adjusted under 35 U.S.C. 154(b) by 22 days.

(21) Appl. No.: 16/104,780

(22) Filed: Aug. 17, 2018

(65) Prior Publication Data
US 2020/0056503 A1  Feb. 20, 2020

(51) Int. Cl.
*B23B 1/00* (2006.01)
*F01D 25/12* (2006.01)

(52) U.S. Cl.
CPC ............ *F01D 25/12* (2013.01); *B23B 1/00* (2013.01); *B23B 2215/76* (2013.01); *F05D 2220/32* (2013.01); *F05D 2230/13* (2013.01); *F05D 2230/211* (2013.01); *F05D 2240/12* (2013.01); *F05D 2240/30* (2013.01); *F05D 2240/35* (2013.01); *F05D 2260/202* (2013.01)

(58) Field of Classification Search
CPC ........ A61B 17/221; A61B 2017/00867; A61B 2017/2215; A61B 2017/2217; A61B 17/32056; A61B 2017/2212; A61B 17/26; A61F 2210/0014; F05D 2230/211; F05D 2260/202; F05D 2240/12; F05D 2220/32; F05D 2230/13; F05D 2240/30; F05D 2240/35; F01D 25/12; B23B 1/00; B23B 2215/76
See application file for complete search history.

(56) References Cited

U.S. PATENT DOCUMENTS

| 6,668,906 B2 * | 12/2003 | Burd ................... B22C 9/04 164/302 |
| 7,237,595 B2 | 7/2007 | Beck et al. |
| 7,841,083 B2 | 11/2010 | Alaux et al. |

(Continued)

FOREIGN PATENT DOCUMENTS

| EP | 1043479 A2 | 10/2000 |
| EP | 3205821 A1 | 8/2017 |
| WO | WO2014/113184 A1 | 7/2014 |

OTHER PUBLICATIONS

Extended European Search Report for EP Application No. 19190830.0, dated Jan. 13, 2020, 9 pages.

(Continued)

*Primary Examiner* — Lawrence Averick
(74) *Attorney, Agent, or Firm* — Kinney & Lange, P.A.

(57) ABSTRACT

A gas turbine part with a cooling hole, is fabricated by first forming a model of a wall of a gas turbine part. The wall is defined by first and second surfaces, the first surface having an aperture indentation possessing a complex geometry and extending into but not all the way through the wall of the gas turbine part. A mold of the wall of the gas turbine part is formed using the model and is used to cast the wall of the gas turbine part by lost-material casting. A passage is drilled through the resulting casting. This passage extends from the aperture indentation in the first surface through to the second surface.

15 Claims, 5 Drawing Sheets

(56) References Cited

U.S. PATENT DOCUMENTS

| | | | |
|---|---|---|---|
| 9,517,506 B2 | 12/2016 | Hu | |
| 2006/0032604 A1* | 2/2006 | Beck | B22C 9/00 |
| | | | 164/361 |
| 2007/0175009 A1* | 8/2007 | Alaux | B22C 7/02 |
| | | | 29/225 |
| 2008/0219853 A1* | 9/2008 | Baker | F01D 5/3061 |
| | | | 416/241 R |
| 2011/0189440 A1* | 8/2011 | Appleby | B29C 33/301 |
| | | | 428/156 |
| 2013/0139990 A1* | 6/2013 | Appleby | B22C 9/04 |
| | | | 164/47 |
| 2013/0209228 A1 | 8/2013 | Xu | |

OTHER PUBLICATIONS

Y.S. Lerner, "New trends in rapid prototyping and rapid manufacturing applications in metal casting", from Foundry Trade Journal, Institute of Cast Metals Engineers, vol. 178, No. 3618, Oct. 1, 2004, pp. 336-343.

\* cited by examiner

METHOD FOR FORMING COOLING HOLES HAVING SEPARATE COMPLEX AND SIMPLE GEOMETRY SECTIONS

BACKGROUND

The present invention relates generally to the fabrication of cooling holes, and more specifically to film cooling holes with hole exits possessing complex geometries.

Film cooling holes are incorporated onto a variety of gas turbine parts and allow a gas turbine engine to operate at higher temperatures than otherwise feasible without film cooling. In order to increase the efficiency of film cooling, cooling holes can be fabricated to possess a complex exit geometry section at the intersection of the hole and the cooled surface. This complex geometry can include a fanned or otherwise smoothed transition that provides superior diffusion characteristics as compared to simple geometry openings such as abrupt transitions between planar walls and cylindrical holes therethrough. Smoother transitions between hole and wall promote laminar flow and keep film flow attached to the surface of the gas turbine part.

Generally, complex hole geometries are fabricated by electric discharge machining (EDM). Simpler geometries (e.g. holes in the form of simple cylindrical bores) can be formed via laser drilling or other techniques that are generally faster and less costly than EDM.

SUMMARY

The present invention relates to a multi-step method for forming a wall of a gas turbine part containing cooling holes having separate complex and simple geometry sections. A model of a wall of a gas turbine part is formed. The wall is defined by first and second surfaces, the first surface having an aperture indentation extending into but not all the way through the wall of the gas turbine part. The aperture indentation possesses a complex geometry. The model is used to form a mold of the wall of the gas turbine part, which is then used to form the wall of the gas turbine part by lost-material casting. After this casting, a passage possessing a simple geometry is formed using a drilling technique. The passage extends from the aperture indentation in the first surface and connects to the second surface.

DETAILED DESCRIPTION

Figure 1:
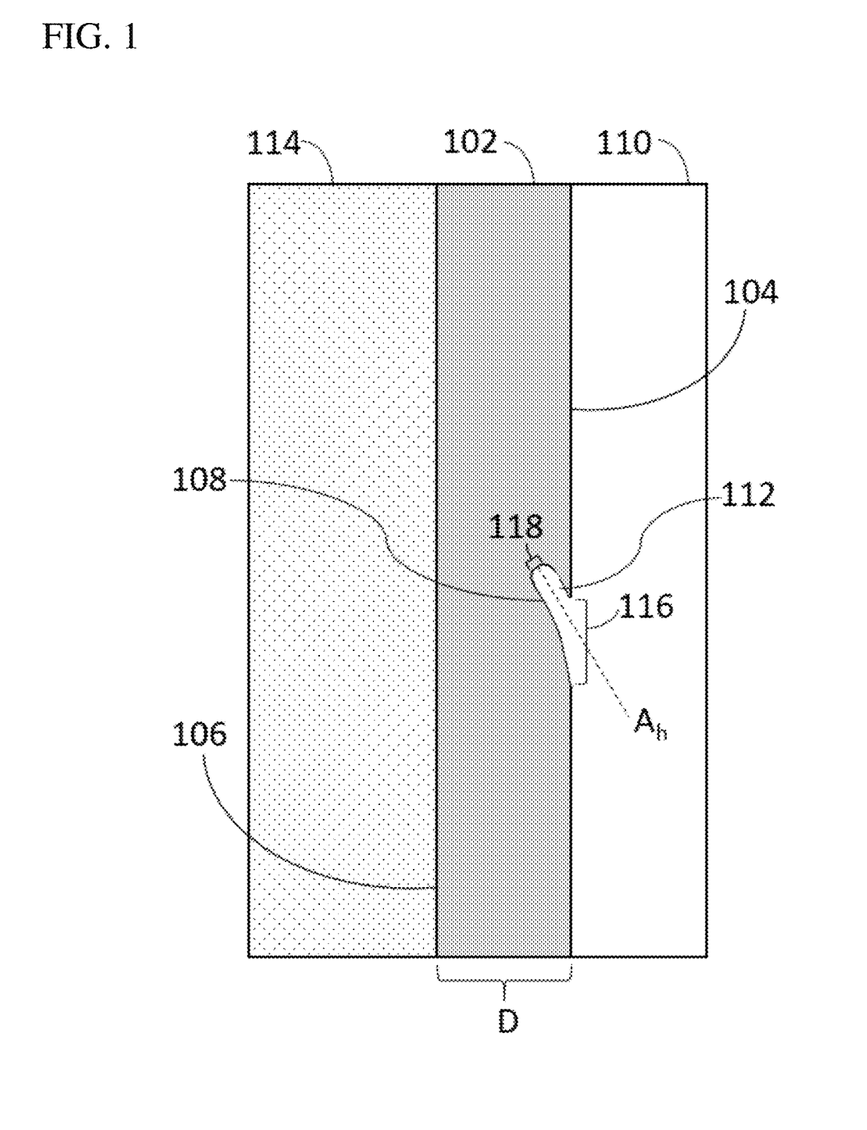
FIG. 1 is a cross-sectional view of an embodiment of an intermediate workpiece after performing a step of a method for forming a wall of a gas turbine part containing a cooling hole.

FIG. 1 is a cross-sectional view of workpiece 102, a component used to form a wall of a gas turbine part containing a cooling hole. FIG. 1 illustrates workpiece 102 in an incomplete form, as an intermediate workpiece. In some embodiments, the workpiece 102 can be a part of an airfoil, a turbine vane, or a combustor panel. FIG. 1 additionally depicts molds 110 and 114 bracketing workpiece 102.

In the depicted embodiment, workpiece 102 has total depth D, and is defined by first surface 104 and second surface 106. First surface 104 includes aperture indentation 108, which extends from outer opening 116 to inner tip 118. Workpiece 102 can, for example, be made of a metal material, and is formed through lost-material casting. Mold 110 contains mold protrusion 112 at the location of aperture indentation 108. This location corresponds to the eventual location of cooling hole through workpiece 102, when complete. In some embodiments, a physical model of workpiece 102 can be formed using a molding die. In some of such embodiments, the molding die also contains protrusion 112 that forms aperture indentation 108 in the model of workpiece 102. In FIG. 1, aperture indentation 108 is bell-shaped. In other such embodiments, aperture indentation 108 can be formed using a separate fabrication step, such as melting or carving. Generally, mold 114, mold 110, and mold protrusion 112 are formed using a model of workpiece 102 as a template. In some embodiments, this model of workpiece 102 can be formed of wax, forming workpiece 102 via e.g. lost-wax casting, or of alternative materials such as foam, e.g. lost-foam casting. Further, as would be understood a person of ordinary skill in the art, any material possessing a low melting point or that can readily evaporate can also be used to form the model of workpiece 102.

FIG. 1 depicts molds 114 and 110 as rectangular and arranged in a parallel orientation. More generally, however, molds 114 and 110 can have a wide range of geometries, including non-planar shapes, and can be arranged in any orientation relative to one another. In some embodiments, workpiece 102 can be an outer surface of a hollow gas turbine part, such as an airfoil. In such an embodiment mold 114 can, for example, be a core die.

Mold protrusion 112 and aperture indentation 108 may adopt one of a variety of complex geometries to promote laminar flow through aperture indentation 108 and keep film flow attached to first surface 104. As used herein, a 'complex geometry' is defined as a three-dimensional shape that is not a cylinder, cuboid, or another shape that resembles a prism. Generally, a 'complex geometry' includes shapes with a hole axis $A_h$ wherein the cross-sectional area of a plane parallel to first surface 104 decreases from outer opening 116 to inner tip 118 along hole axis $A_h$. Outer opening 116 and inner tip 118 of aperture indentation 108 can differ in cross-sectional shape. In at least some embodiments, the complex geometry of aperture indentation 108 can taper from widest at outer opening 116 to narrowest at inner tip 118. For instance, in some embodiments, the complex geometry of aperture indentation 108 can resemble a bowed or rounded pyramid or cone having a base at the outer opening of the cavity. In other embodiments, the complex geometry of aperture indentation 108 can resemble a curved pipe or tube that narrows toward tip 118, outer opening 116 of aperture indentation 108 can have a generally round or oval shape, and aperture indentation 108 can taper inward as a function of depth of hole axis $A_h$. In the illustrated embodiment, the cross-sectional area of aperture indentation 108 is lowest tip 118.

In some embodiments, the complex geometry of aperture indentation 108 can include features that project away from first surface 104 into mold 110 such that a portion of first surface 104 adjacent to aperture indentation 108 is not flat. For example, aperture indentation 108 can include a volcano-shaped projection or a hood-shaped projection. In the embodiment depicted in FIG. 1, aperture indentation 108 has a bell shape and does not deeply penetrate workpiece 102. However, aperture indentation 108 may have a different complex shape and reach varying depths of workpiece 102 without spanning the entire depth D. In general, the complex geometry of mold protrusion 112 provides the eventual resulting workpiece with a smooth transition curvature at the interface of aperture indentation 108 and first surface 104, thereby promoting laminar flow and keeping film flow attached for better cooling. In the embodiment depicted in FIG. 1, mold protrusion 112 tapers such that a cross-sectional area of inner tip 118 of aperture indentation 108 is substantially smaller than a cross-sectional area of outer opening 116 of aperture indentation 108.

Figure 2:
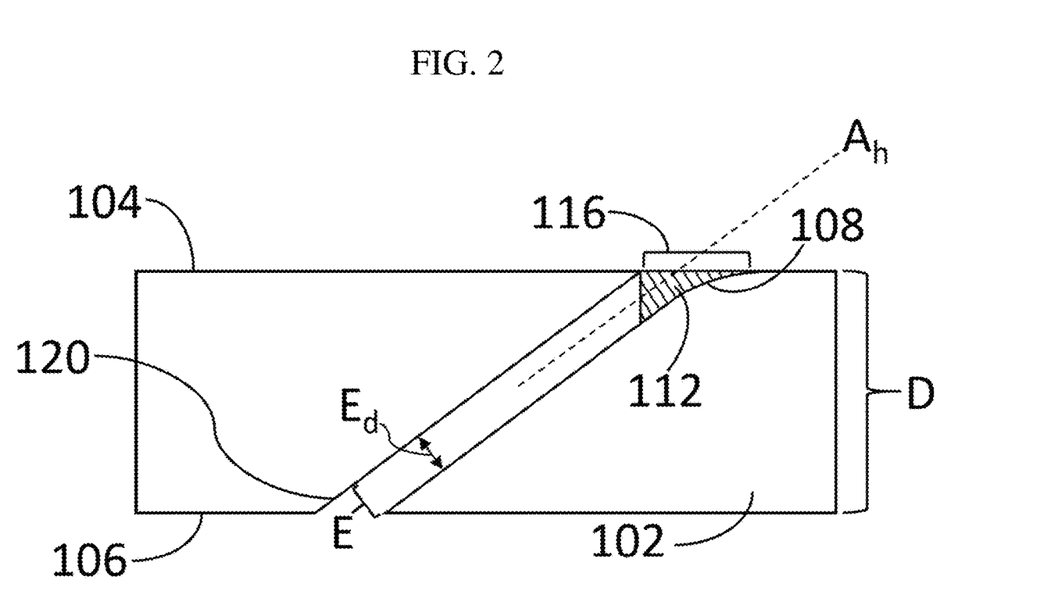
FIG. 2 is a cross-sectional view of an embodiment of the intermediate workpiece after performing a further step of the method.

FIG. 2 is a cross-sectional view of an embodiment of the intermediate workpiece after another step of the method for forming a wall of a gas turbine part containing a cooling hole has been performed. Passage 120 is formed through workpiece 102, and extends from aperture indentation 108 to second surface 106. Molds 110 and 114 are released prior to forming passage 120. Likewise, mold protrusion 112 is released from aperture indentation 108 prior to forming passage 120. In FIG. 2, the area occupied by mold protrusion 112 prior to release is shown as hashed lines. Passage 120 has a simple geometry and can be formed to be cylindrical, rectangular, or another shape that can be formed by a drilling technique. As used herein, a 'simple geometry' is defined as a three-dimensional shape that has a substantially uniform cross-sectional area along a length or otherwise resembles a cuboid, cylinder, or prism. In an exemplary embodiment, passage 120 is formed via laser drilling. Generally, cross-sectional area E of passage 120 is larger than the area of tip 118 of aperture indentation 108, but smaller than the cross-sectional area at outer opening 116 to minimize steps or abrupt surface discontinuities, and such that minor misalignment of passage 120 relative to aperture indentation 108 does not significantly affect airflow characteristics of the cooling hole. Passage 102 can, for example, have a circular cross-section with exit diameter $E_d$ less than a corresponding maximum dimension of tip 118. This geometry enhances air diffusion by reducing or eliminating sharp steps or discontinuities in the surface of passage 102. In some embodiments, aperture indentation 108 can be used to indicate the location for forming passage 120.

In FIG. 2, mold protrusion 112 is shown to be extending in a direction that is substantially orthogonal with first surface 104 and second surface 106. However, in another embodiment, mold protrusion 112 may extend in a direction that is non-orthogonal with first surface 104 or second surface 106. FIG. 1 depicts one such embodiment. Back lock between workpiece 102 and mold 110 can occur during mold release in embodiments where mold protrusion 112 is oriented at least partially non-orthogonally with first surface 104, and extends to form a cavity recessed behind first surface 104. Forming mold 110 and mold protrusion 112 entirely or partly of a flexible material can overcome back lock during mold release, allowing a large number of shapes and orientations of mold protrusion 112 to be utilized. In embodiments where mold protrusion 112 extends at least partially in a direction substantially non-orthogonal with first surface 104 or second surface 106 and a molding die is utilized to form the model of workpiece 102, the molding die can also be comprised of a flexible material to prevent back lock with the model of workpiece 102.

In the embodiment depicted in FIG. 2, passage 120 is non-orthogonal with first surface 104 or second surface 106. In other embodiments passage 120 can be orthogonal with first surface 104 or second surface 106. In exemplary embodiments, passage 120 is drilled from the interior of aperture indentation 108 toward second surface 106. In such embodiments, passage 120 is drilled along a line of sight from inner tip 118 of aperture indentation 108 and can therefore be constrained by the orientation of aperture indentation 108. Generally, passage 120 is collinear with hole axis $A_h$.

Figure 3A:
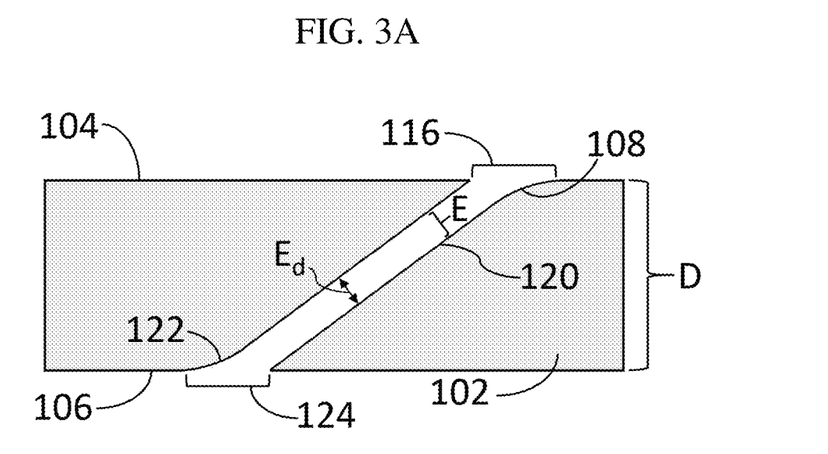
FIGS. 3A and 3B are cross-sectional views of alternative embodiments of the intermediate workpiece after performing another step of the method.
Figure 3B:
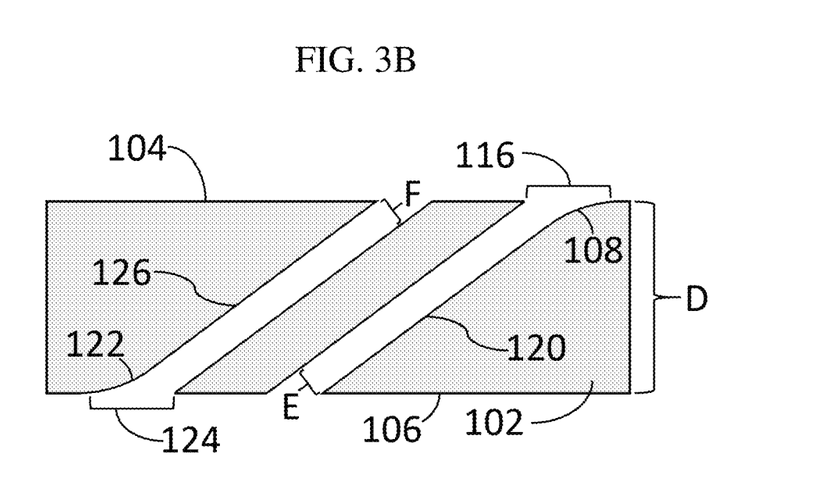

FIGS. 3A and 3B are cross-sectional views of embodiments of the intermediate workpiece wherein a second aperture indentation 122 has been formed in second surface 106 during casting. In such embodiments, a wax model of workpiece 102 containing second aperture indentation 122 in the wax model of second surface 106 can be used, forming both a protrusion in mold 114 and, after casting, second aperture indentation 122 in second surface 106 of workpiece 102. In some embodiments, passage 120 can connect the second aperture indentation 122 in second surface 106 with aperture indentation 108 in first surface 104. Second aperture indentation 122 has a complex geometry that can be the same as or different from the complex geometry of aperture indentation 108 and a cross-sectional area at outer opening 124 that can be the same as or different from the cross-sectional area at outer opening 116 of aperture indentation 108. FIG. 3A depicts on such embodiment, wherein aperture indentation 108 and second aperture indentation 122 have substantially the same shape and cross-sectional areas at outer openings 116 and 124, respectively. In some of these embodiments, penetrative imaging techniques can be utilized to locate second aperture indentation 122 prior to forming passage 120 so that second aperture indentation 122 is connected to aperture indentation 108 by passage 120. In other embodiments containing second aperture indentation 122 in second surface 106, passage 120 does not connect to the additional aperture indentation in second surface 106. In such embodiments, passage 120 can connect aperture indentation 108 to second surface 106 and a second passage 126 can be formed to connect the additional aperture indentation in second surface 106 to first surface 104. In such embodiments, second aperture indentation 122 has a complex geometry that can be the same as or different from the complex geometry of aperture indentation 108 and a cross-sectional area at outer opening 124 that can be the same as or different from the cross-sectional area at outer opening 116 of aperture indentation 108. Second passage 126 has a cross sectional area F that can be the same as or different from cross sectional area E of passage 120. FIG. 3B depicts one such embodiment, wherein aperture indentation 108 and second aperture indentation 122 have substantially the same shape and cross-sectional areas at outer openings 116 and 124, respectively, and passage 120 and second passage 126 have substantially the same shape and cross-sectional areas E and F, respectively.

Figure 4A:
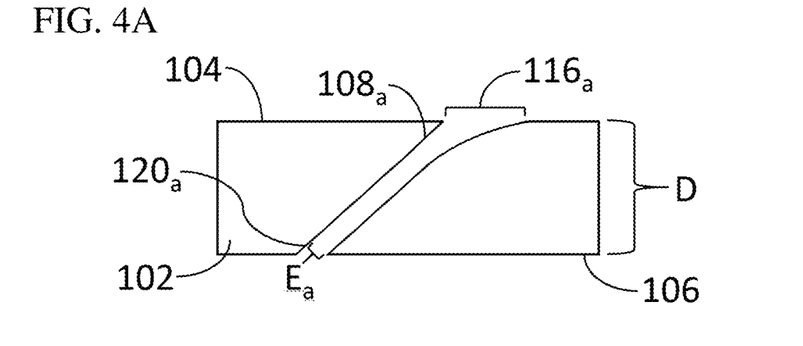
FIGS. 4A-4C are cross-sectional views of embodiments of a wall of a gas turbine part containing an aperture indentation.
Figure 4B:
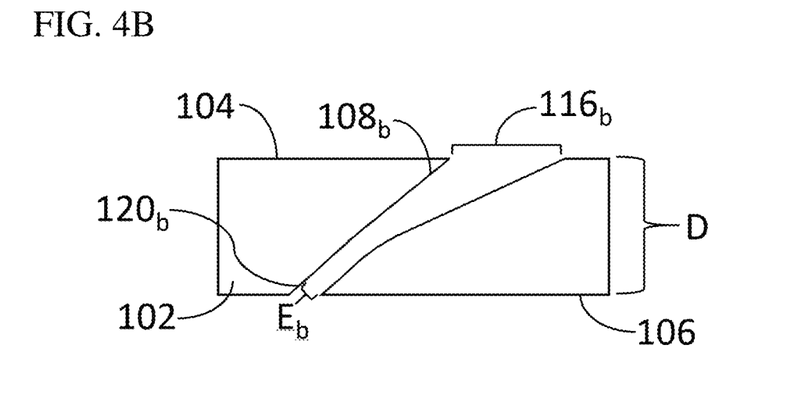
Figure 4C:
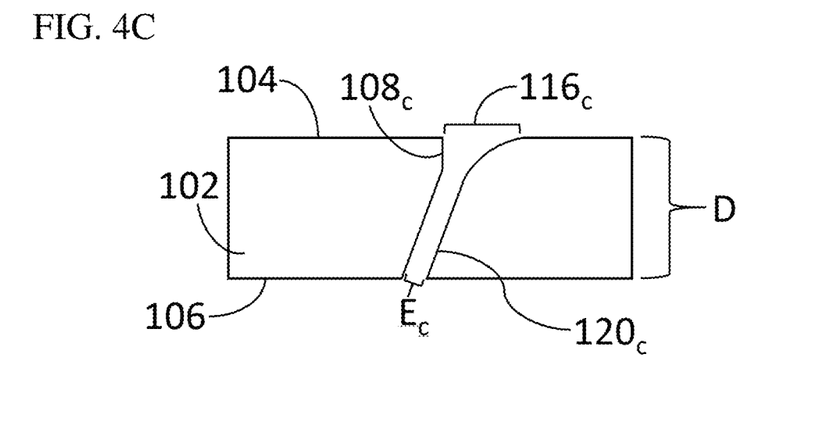

FIGS. 4A-4C show cross-sectional views of embodiments of a wall of a gas turbine part containing an aperture indentation. FIGS. 4A and 4B show embodiments of an aperture indentation that is fan-shaped and is oriented non-orthogonally with first surface 104 or second surface 106. FIG. 4A shows an embodiment wherein aperture indentation $108_a$ does not penetrate workpiece 102 deeply. Aperture indentation $108_a$ is connected to passage $120_a$, which has cross-sectional area $E_a$. The cross-sectional area at outer opening $116_a$ is larger than cross-sectional area $E_a$. FIG. 4B shows another embodiment wherein aperture indentation $108_b$ penetrates workpiece 102 deeply. Aperture indentation $108_b$ is connected to passage $120_b$, which has cross-sectional area $E_b$. The cross-sectional area at outer opening $116_b$ is larger than cross-sectional area $E_b$. FIG. 4C shows another embodiment wherein aperture indentation $108_c$ is substantially orthogonal with first surface 104 and second surface 106. Aperture indentation $108_c$ is connected to passage $120_c$, which has cross-sectional area $E_c$. The cross-sectional area at outer opening $116_c$ is larger than cross-sectional area $E_c$. In the embodiments depicted in FIGS. 4A-4C, passages $120_a$, $120_b$, and $120_c$ are oriented non-orthogonally with first surface 104 and second surface 106.

Figure 5:
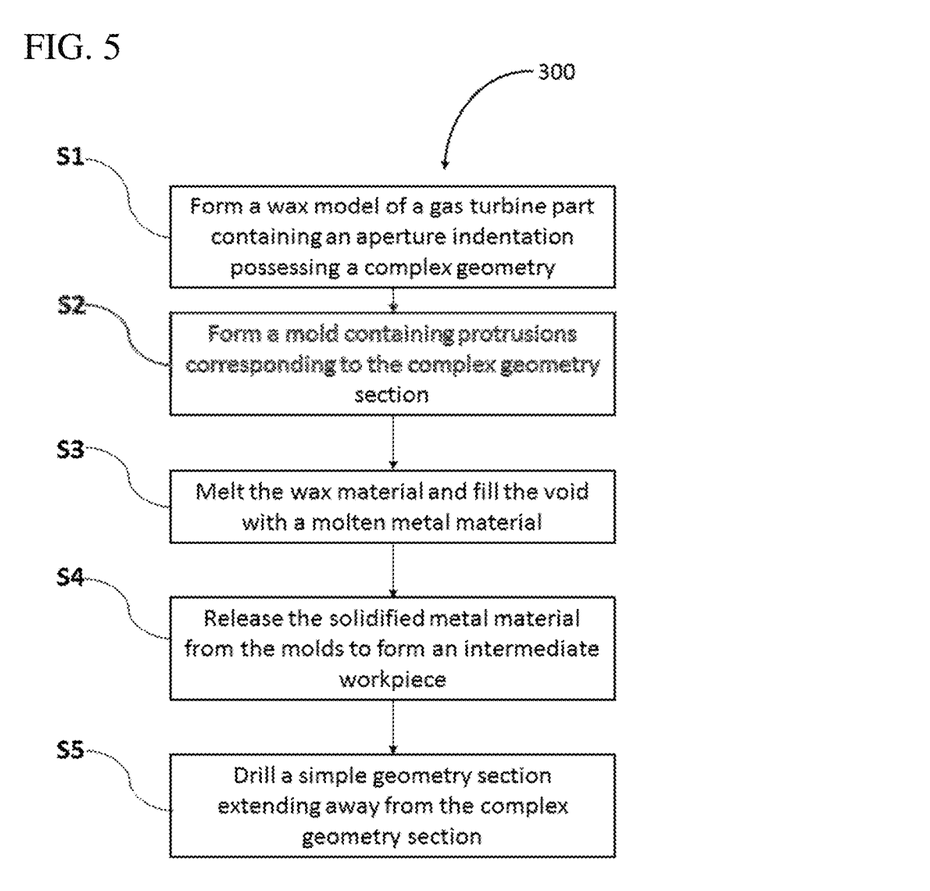
FIG. 5 is a flow chart of an embodiment of a method for forming cooling holes possessing an aperture indentation having a complex geometry and a passage having a simple geometry.

FIG. 5 is a flow chart of an embodiment of method 300, a method for forming cooling holes possessing aperture indentation 108 and passage 120, wherein aperture indentation 108 has a complex geometry and passage 120 has a simple geometry. In step S1, a model of workpiece 102 is formed having first surface 104 and second surface 106, and containing aperture indentation 108. The model of workpiece 102 can be formed of wax, foam, another material that has a low melting point or that can readily evaporate, as would be understood a person of ordinary skill in the art. Aperture indentation 108 has a complex geometry. In some embodiments, the model of workpiece 102 is formed using a molding die. In some of such embodiments, the molding die also contains protrusion 112 that forms aperture indentation 108 in the model of workpiece 102. In other of such embodiments, aperture indentation 108 is formed using a separate fabrication step, such as melting or carving. As previously discussed, in some embodiments a model of workpiece 102 can be made of wax and can alternatively be made of foam. In step S2, molds 114 and 110 are formed. Mold 110 has a protrusion 112 of a shape corresponding to aperture indentation 108. The ceramic or thermally resistant material surrounds the wax model of workpiece 102. In step S3, the wax material is melted and removed, leaving a void that is then filled with a molten metal material. When the molten metal material cools and forms a solidified metal material, it will be shaped to have first surface 104, second surface 106, and aperture indentation 108. In step S4, the solidified metal material is released from molds 114 and 110 to form an intermediate workpiece. In step S5, passage 120 is formed in the intermediate workpiece by drilling. Passage 120 can have a simple geometry, extend from aperture indentation 108, and connect to second surface 106 or to second aperture indentation 122, as discussed with respect to FIGS. 3A and 3B.

Discussion of Possible Embodiments

The following are non-exclusive descriptions of possible embodiments of the present invention.

A method for fabricating a gas turbine part with a cooling hole extending primarily along a hole axis, the method comprising: forming a model of a wall of a gas turbine part, the wall defined by first and second surfaces, the first surface having an aperture indentation extending into but not all the way through the wall of the gas turbine part, the aperture indentation possessing an outer opening and an inner tip, wherein the cross-sectional area of the aperture indentation in a plane parallel to the first surface decreases along the hole axis from the outer opening to the inner tip; forming a mold of the wall of the gas turbine part using the model; forming the wall of the gas turbine part by lost-material casting; and after forming the wall by lost-material casting, drilling a passage from the aperture indentation in the first surface through to the second surface to form the cooling hole.

The method of the preceding paragraph can optionally include, additionally and/or alternatively, any one or more of the following features, configurations, and/or additional components:

A further embodiment of the foregoing method, wherein the second surface of the wall of the gas turbine part can contain a second aperture indentation extending into but not all the way through the wall of the gas turbine part, the second aperture indentation possessing a non-uniform cross-sectional area such that an opening of the second aperture indentation at the second surface and the tip of the second aperture indentation possess different cross-sectional areas.

A further embodiment of the foregoing method, wherein the passage can be formed so as to extend from the first aperture indentation through to the second aperture indentation.

A further embodiment of the foregoing method can include penetratively imaging to locate the aperture indentation in the second surface before forming the passage.

A further embodiment of the foregoing method, wherein the passage can possess a simple geometry.

A further embodiment of the foregoing method can include drilling the passage with a laser drilling technique.

A further embodiment of the foregoing method, wherein the mold can comprise a flexible material.

A further embodiment of the foregoing method, wherein the aperture indentation can be shaped to prevent back lock with the mold.

A further embodiment of the foregoing method, wherein the aperture indentation can extend into the wall of the gas turbine part in a direction that is non-orthogonal with the first or second surface.

A further embodiment of the foregoing method, wherein the aperture indentation can be bell-shaped or fan-shaped.

A further embodiment of the foregoing method, wherein the aperture indentation tapers to a minimum cross-sectional area smaller than a cross-sectional area of the passage.

A further embodiment of the foregoing method, wherein the wall can further comprise a feature that projects away from the first surface of the gas turbine part adjacent to the aperture indentation.

A further embodiment of the foregoing method, wherein the gas turbine part can be an airfoil.

A further embodiment of the foregoing method, wherein the gas turbine part can be a combustor panel.

A further embodiment of the foregoing method, wherein the lost-material casting can be lost-wax casting or lost-foam casting.

An intermediate workpiece for the production of a wall of a gas turbine part, the intermediate workpiece defined by first and second surfaces, the first surface having an aperture indentation at the eventual location of a cooling hole, the aperture indentation extending into but not all the way through the wall of the gas turbine part, the aperture indentation possessing a non-uniform cross-sectional area such that an opening of the aperture indentation at the first surface and a tip of the aperture indentation possess different cross-sectional areas.

A further embodiment of the foregoing intermediate workpiece, wherein the aperture indentation can be bell-shaped or fan-shaped.

A further embodiment of the foregoing intermediate workpiece, wherein the second surface can have an aperture indentation extending into, but not all the way through the intermediate workpiece, the aperture indentation possessing a complex geometry.

A further embodiment of the foregoing intermediate workpiece, wherein the aperture indentation can extend into the intermediate workpiece in a direction that is orthogonal with the first surface.

A further embodiment of the foregoing intermediate workpiece, wherein the aperture indentation can extend into the intermediate workpiece in a direction that is non-orthogonal with the first or second surface.

The invention claimed is:

1. A method for fabricating a gas turbine part with a cooling hole extending primarily along a hole axis, the method comprising:
   forming a model of a wall of a gas turbine part, the wall defined by first and second surfaces, the first surface having an aperture indentation extending into but not all the way through the wall of the gas turbine part, the aperture indentation possessing an outer opening and an inner tip, wherein the cross-sectional area of the aperture indentation in a plane parallel to the first surface decreases along the hole axis from the outer opening to the inner tip;
   forming a mold of the wall of the gas turbine part using the model;
   forming the wall of the gas turbine part by lost-material casting; and
   after forming the wall by lost-material casting, drilling a passage from the aperture indentation in the first surface through to the second surface to form the cooling hole, wherein a cross-sectional area of the passage is larger than the cross-sectional area of the aperture indentation at the inner tip.

2. The method of claim 1, wherein the second surface of the wall of the gas turbine part contains a second aperture indentation extending into but not all the way through the wall of the gas turbine part, the second aperture indentation possessing a non-uniform cross-sectional area such that an opening of the second aperture indentation at the second surface and an inner tip of the second aperture indentation possess different cross-sectional areas.

3. The method of claim 2, wherein the passage is formed so as to extend from the first aperture indentation through the wall to the second aperture indentation.

4. The method of claim 2, further comprising penetratively imaging to locate the aperture indentation in the second surface before forming the passage.

5. The method of claim 1, wherein the passage possesses a simple geometry having a substantially uniform cross-sectional area along a length of the passage.

6. The method of claim 1, further comprising drilling the passage with a laser drilling technique.

7. The method of claim 1, wherein the mold comprises a flexible material.

8. The method of claim 1, wherein the aperture indentation is shaped to prevent back lock with the mold.

9. The method of claim 1, wherein the aperture indentation extends into the wall of the gas turbine part in a direction that is non-orthogonal with the first or second surface.

10. The method of claim 1, wherein the aperture indentation is bell-shaped or fan-shaped.

11. The method of claim 1, wherein the wall further comprises a feature that projects away from the first surface of the gas turbine part, wherein the feature is located adjacent to the aperture indentation.

12. The method of claim 1, wherein the gas turbine part is an airfoil.

13. The method of claim 1, wherein the gas turbine part is a combustor panel.

14. The method of claim 1, wherein the lost-material casting is lost-wax casting or lost-foam casting.

15. A method for fabricating a gas turbine part with a cooling hole extending primarily along a hole axis, the method comprising:
   forming a model of a wall of a gas turbine part, the wall defined by first and second surfaces, the first surface having an aperture indentation extending into but not all the way through the wall of the gas turbine part, the aperture indentation possessing an outer opening and an inner tip, wherein the cross-sectional area of the aperture indentation in a plane parallel to the first surface decreases along the hole axis from the outer opening to the inner tip;
   forming a mold of the wall of the gas turbine part using the model, wherein the mold comprises a flexible material;
   forming the wall of the gas turbine part by lost-material casting; and
   after forming the wall by lost-material casting, drilling a passage from the aperture indentation in the first surface through to the second surface to form the cooling hole.

* * * * *